United States Patent
Bhandarkar et al.

(10) Patent No.: US 11,755,821 B2
(45) Date of Patent: *Sep. 12, 2023

(54) AUTOMATED DOCUMENT HIGHLIGHTING IN A DIGITAL MANAGEMENT PLATFORM

(71) Applicant: DocuSign, Inc., San Francisco, CA (US)

(72) Inventors: Mangesh Bhandarkar, Los Altos, CA (US); Shrinivas Kiran Kaza, Fremont, CA (US); Taiwo Raphael Alabi, San Jose, CA (US); Ashwath Mohan, San Ramon, CA (US); Kim Cuong Phung, Hayward, CA (US)

(73) Assignee: DOCUSIGN, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,731

(22) Filed: Aug. 31, 2022

(65) Prior Publication Data
US 2022/0414318 A1 Dec. 29, 2022

Related U.S. Application Data

(63) Continuation of application No. 16/942,673, filed on Jul. 29, 2020, now Pat. No. 11,461,539.

(51) Int. Cl.
*G06F 40/00* (2020.01)
*G06F 40/166* (2020.01)
(Continued)

(52) U.S. Cl.
CPC .......... *G06F 40/166* (2020.01); *G06F 18/214* (2023.01); *G06F 18/40* (2023.01);
(Continued)

(58) Field of Classification Search
CPC ............................. G06F 40/166; G06F 40/295
See application file for complete search history.

(56) References Cited

U.S. PATENT DOCUMENTS 9,634,975 B2    4/2017   McCabe et al.
9,767,186 B2    9/2017   Bhandari et al.
(Continued)

OTHER PUBLICATIONS

Kulkarni, S, "GloVeNoR—Global Vectors for Node Representations," San Jose State University, Department of Computer Science, Master's Projects, 722, May 2019, pp. 1-56.
(Continued)

*Primary Examiner* — Scott T Baderman
*Assistant Examiner* — Barbara M Level
(74) *Attorney, Agent, or Firm* — KDW FIRM PLLC

(57) ABSTRACT

A highlighting engine modifies a target document by identifying and highlighting a set of text passages. The highlighting engine receives a training set of data including documents that each include a set of highlighted text passages. The highlighting engine trains a machine learned model using the training set of data. The trained machine learned model, when applied to subsequent identified candidate sets of text passages within the target document, identifies the set of text passages to highlight. The highlighting engine modifies the target document with the highlighted set of text passages and provides the modified target document for display via an interface. The highlighted set of text passages enable a user to quickly read and understand the target document.

20 Claims, 5 Drawing Sheets

(51) Int. Cl.
  *G06N 20/00* (2019.01)
  *G06F 40/295* (2020.01)
  *G06V 30/414* (2022.01)
  *G06F 18/40* (2023.01)
  *G06F 18/214* (2023.01)

(52) U.S. Cl.
  CPC .......... *G06F 40/295* (2020.01); *G06N 20/00* (2019.01); *G06V 30/414* (2022.01)

(56) References Cited

U.S. PATENT DOCUMENTS

| | | |
|---|---|---|
| 10,430,570 B2 | 10/2019 | Gonser et al. |
| 11,157,475 B1 | 10/2021 | Cobb et al. |
| 2005/0278325 A1 | 12/2005 | Mihalcea et al. |
| 2006/0156222 A1 | 7/2006 | Chi et al. |
| 2017/0177180 A1 | 6/2017 | Bachmann et al. |
| 2017/0286835 A1 | 10/2017 | Ho et al. |
| 2017/0364586 A1 | 12/2017 | Krishnamurthy et al. |
| 2020/0042580 A1 | 2/2020 | Davis et al. |
| 2020/0265188 A1 | 8/2020 | Nahamoo et al. |
| 2020/0279108 A1 | 9/2020 | Shorter et al. |
| 2020/0286463 A1 | 9/2020 | Galitsky |
| 2020/0356637 A1 | 11/2020 | An et al. |
| 2021/0192126 A1 | 6/2021 | Gehrmann et al. |
| 2021/0294829 A1 | 9/2021 | Bender et al. |

OTHER PUBLICATIONS

Erkan, G. et al., "LexRank: Graph-based Lexical Centrality as Salience in Text Summarization," Journal of Artificial Intelligence Research, vol. 22, Dec. 1, 2004, pp. 457-479.

United States Office Action, U.S. Appl. No. 16/942,673, filed Jan. 24, 2022, 47 pages.

AUTOMATED DOCUMENT HIGHLIGHTING IN A DIGITAL MANAGEMENT PLATFORM

CROSS REFERENCE TO RELATED APPLICATIONS

This application is a continuation of U.S. application Ser. No. 16/942,673, filed Jul. 29, 2020, now U.S. Pat. No. 11,461,539, which is incorporated by reference in its entirety.

TECHNICAL FIELD

The disclosure generally relates to the field of document highlighting, and specifically to automated document highlighting in a digital management platform.

BACKGROUND

An entity may provide or create a document for execution within an online document management system (or "online document system"). Conventional online document management systems enable users to manually view and execute documents, but do not provide intelligent analyses of the document contents to automatically highlight relevant passages within the document. To provide an improved, efficient, and more reliable document execution experience for the user, there is a need for a document highlighting engine that analyzes document content based on characteristics of the document, and automatically highlights relevant contents within the document for the user based on this analysis.

SUMMARY

A method for automatically highlighting relevant passages (e.g., relevant sentences) of a document within a document management environment is described herein. A training set of data that includes documents is accessed. In the training set, each document includes a set of highlighted text passages. A machine learned model is trained using the training set of data such that the trained machine learned model is configured to identify and highlight a set of text passages of a target document.

A target document to be highlighted is accessed. A first candidate set of text passages of the target document is identified by converting text of the target document into word vectors. A matrix representation of the target document is generated, where the values in each row of the matrix correspond to the word vectors and each row of the matrix corresponds to a text passage of the target document. An undirected weighted graph is constructed with each node corresponding to a text passage (e.g., a sentence) and each edge that connects two nodes has an edge weight corresponding to a measure of similarity between corresponding text passages. Multiple random walk iterations are performed on the undirected weighted graph that result in a ranking of the text passages by order of relevance. A second candidate set of text passages of the target document is identified based on characteristics of text found in the target document. A third candidate set of text passages of the target document is identified based on feedback from a user of the document management environment. A machine learned model is applied to the first candidate set of text passages, the second candidate set of text passages, and the third candidate set of text passages to identify a set of text passages of the target document to highlight. The target document is automatically modified by highlighting the identified set of text passages.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
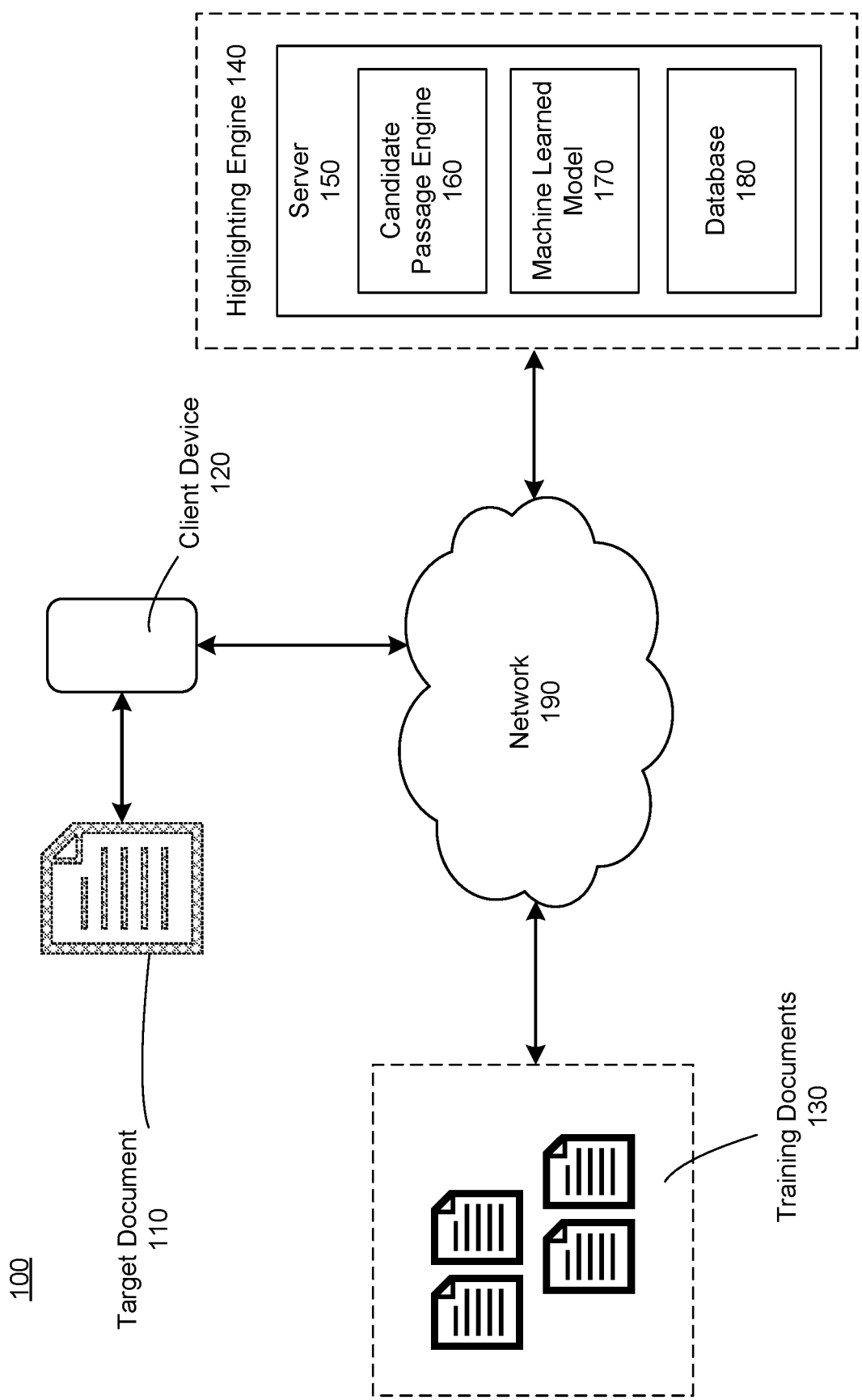
FIG. 1 illustrates an example document management environment in which a set of passages within a document can be identified for highlighting, in accordance with one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Document Management Environment Overview

The methods described herein use machine learning to automatically highlight a document in a document management environment. The document management environment enables a party (e.g., individuals, organizations, etc.) to create and send documents to one or more receiving parties for negotiation, collaborative editing, electronic execution (e.g., electronic signature), automation of contract fulfilment, archival, and analysis. Within the document management environment, a receiving party may review content and/or terms presented in a digital document, and in response to agreeing to the content and/or terms, can electronically execute/digitally sign the document. In some embodiments, the receiving party provides the sending party (e.g., the party that created and sent the document for execution) with feedback on the content and/or terms in the document received for execution. In some embodiments, the receiving party completes and/or contributes to a portion of the content and/or terms in the document. Additionally, the sending party may access and/or share data associated with the document within the document management environment, such as a time and location at which the receiving party accesses, views, and/or executes the document. In some embodiments, the receiving and/or sending parties also have access to archival data of similar documents. In some embodiments, the document management environment enables payments between the receiving and sending parties. DocuSign, Inc's e-Signature product is an example of functionality that is implemented within a document management environment. A document management environment and example functionality are further described in U.S. Pat. No. 9,634,975, issued Apr. 25, 2017, and U.S. Pat. No. 10,430,570, issued Oct. 1, 2019, which are hereby incorporated by reference in their entireties.

The system environment described herein can be implemented within an online document system, a document management system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

The processes described herein automatically highlight a document for a user. A highlighted document includes at least one highlighted text passage that corresponds to a relevant passage of the document. The document management environment accesses a target document and identifies various candidate sets of text passages. For instance, a candidate set of text passages may be identified based on ranking. In another instance, a candidate set of text passages may be identified based on text characteristics and/or based on user feedback. The document management environment inputs the identified candidate sets of text passages to a machine learned model trained on historical documents and configured to identify a set of text passages to highlight. The document management environment provides a modified target document (i.e., a target document with the identified set of text passages highlighted) to one or more users.

Conventionally, a user inspecting a document needs to either read the entire document or skim significant portions of the document to find and understand relevant portions of that document. This can be a time-consuming process for a user especially with multi-page documents and even more time-consuming when the user is on a mobile device (e.g., a smartphone, a tablet, etc.). In many scenarios, the user may become distracted or tired of reading and/or skimming through a document. Thus, the user may misunderstand relevant portions or completely miss relevant portions of the document. Automatically highlighting relevant passages within a document enables users to read and understand the document in a more efficient manner. For example, a user may review the highlighted passages of the document first and skim the remaining portions of the document. Conventional solutions to automatically highlighting passages within a document rely on pre-programmed logic and rules that often aren't flexible to unexpected content or user-made changes within documents. Further, conventional automatic highlighting solutions are often designed with a particular document type in mind and may perform poorly when applied to different document types. Thus, by applying a machine learned model trained on pre-highlighted documents of varying document types while minimizing human involvement or intervention, the document management environment is able to improve a user's experience with the document review process.

FIG. 1 illustrates an example document management environment 100 in which a set of passages within a document can be identified for highlighting, in accordance with one or more embodiments. As described above, the document management environment 100 enables a sending party to create and send digital documents for electronic execution to one or more receiving parties. The receiving parties may review, modify, and execute the documents. The document management environment 100 uses a machine learned model to identify and automatically highlight relevant passages in a document sent for execution. As used herein, a "relevant passage" refers to a text passage of a document that provides contextual information of an above-threshold importance about the document, for example, information such as the parties to a contract/agreement, critical terms of the contract/agreement (e.g., payment terms, deadlines, considerations for early termination, etc.), a total value of the contract/agreement, parties that have previously signed the contract/agreement, and so on. As illustrated in FIG. 1, the document management environment 100 includes a target document 110 for highlighting, a client device 120, a set of training documents 130, and a highlighting engine 140, each communicatively interconnected via a network 190. In some embodiments, the document management environment includes components other than those described herein. For the purposes of concision, the web servers, data centers, and other components associated with an online document management environment are not shown in the embodiment of FIG. 1.

The target document 110 for highlighting is analyzed to identify and highlight a set of text passages within the target document 110. The set of text passages are determined to be relevant passages for the target document 110, (e.g., legal clauses, financial terms, and the like). Each target document 110 may be associated with a document type, such as sales contract, employee agreement, confidentiality agreement, rental agreement, bank form, and so on. The document type may indicate certain relevant passages that are typically found in documents of that document type. For example, a sales contract (document type) typically includes one of more of the following relevant passages: identification of the seller, identification of the purchaser, identification of the purchased item(s), cost of purchased item(s), payment terms, late payment penalties, and so on. The highlighting engine 140 receives the target document 110 from the sending party via the client device 120 (or receives instructions to create the target document 110 within the document management environment 100 from the client device 120) and provides it to the receiving party (not illustrated in the embodiment of FIG. 1), for instance for signing. It should be noted that although examples are given herein in the context of a single document, the document management environment 100 can coordinate the creation, viewing, editing, and signing of any number of documents (e.g., thousands, millions, and more) for any number of users or accounts, and for any number of entities or organizations.

The client device 120 enables a user to provide the target document 110 to the highlighting engine 140. The client device 120 is a computing device capable of transmitting and/or receiving data over the network 190. The client device 120 may be a conventional computer (e.g., a laptop or a desktop computer), a cell phone, or a similar device.

After the highlighting engine 140 determines that a set of text passages in the target document 110 is relevant and highlights the set of text passages, the client device 120 can generate and display to the user a modified target document including the highlighted set of text passages. In some embodiments, the user may provide feedback to the highlighting engine 140 via the client device 120. For example, the user may approve or reject one or more highlighted text passages identified and automatically highlighted by the highlighting engine 140.

The training documents 130 serve as a training set of information for training the machine learned model to identify the set of text passages to automatically highlight within a document. The training documents 130 each include a set of highlighted text passages within the document. Each highlighted text passage corresponds to a relevant passage of the document. In some embodiments, one or more users are responsible for manually creating and/or managing the training documents 130. For example, the users may manually curate and/or provide the set of highlighted text passages in the training documents 130 to the highlighting engine 140. In some embodiments, the training set of data can include historical documents associated with the document management environment 100 that have been manually highlighted.

The highlighting engine 140 automatically applies highlighting to the target document 110 using a candidate passage engine 160 and a machine learned model 170. The highlighting engine 140 can minimize or remove user involvement entirely when automatically applying highlighting to the target document 110. In response to the candidate passage engine 160 identifying candidate sets of text passages of the target document 110, the machine learned model 170 identifies, from the candidate sets of text passages, a set of text passages of the target document 110 to highlight. In response to the machine learned model 170 identifying the set of text passages of the target document 110 to highlight, the highlighting engine 140 highlights the set of text passages. The highlighting engine 140 thus modifies the target document 110 by automatically highlighting the set of text passages. The highlighting engine 140 presents to the user, via the client device 120, the modified target document. In some embodiments, the highlighting engine 140 identifies a set of text passages to highlight in more than one document. The highlighting engine 140 includes a server 150, which hosts and/or executes the candidate passage engine 160, the machine learned model 170, and a database 180.

The server 150 receives and stores information from the document management environment 100. The server 150 may be located on a local or remote physical computer and/or may be located within a cloud-based computing system. The server 150 accesses the target document 110 for highlighting, for instance by receiving it from the client device 120, by retrieving the document from storage associated with the document management environment 100, by retrieving the document from storage independent of the document management environment 100, and the like. In some embodiments, the server 150 receives feedback from the user regarding a modified target document, for instance feedback manually approving or rejecting automatically highlighted passages within the modified target document. In some embodiments, the server 150 is a document server, storing any number of documents within the environment 100, including the modified target document.

The candidate passage engine 160 identifies candidate sets of text passages of the target document 110 for highlighting. The candidate passage engine 160 identifies a first candidate set of text passages by converting the target document 110 into word vectors. In one embodiment, the candidate passage engine 160 ranks each text passage (e.g., ranks each sentence) of the target document 110 based on the word vectors for each text passage. In this embodiment, the first candidate set of text passages can include a threshold portion of the ranked text passages (e.g., a top 10% of text passages). The candidate passage engine 160 identifies a second candidate set of text passages of the target document 110 based on text characteristics found in the target document 110. The candidate passage engine 160 identifies a third candidate set of text passages of the target document 110 based on feedback from the user. The application of the candidate passage engine 160 is further discussed with respect to FIG. 2.

The machine learned model 170 is configured to identify, from the candidate sets of text passages, a set of text passages to highlight within the target document 110 for highlighting. The machine learned model 170 is trained on a training set of data. The training set of information includes the training documents 130, each including a set of highlighted text passages. After being trained, the machine learned model 170 is applied to the first candidate set of text passages, the second candidate set of text passages, and the third candidate set of text passages identified by the candidate passage engine 160. In some embodiments, the machine learned model 170 is applied to a subset of the candidate sets of text passage. For example, the machine learned model 170 may be applied to the first and second candidate sets, the first and third candidate sets, the second and third candidate sets, the first candidate set only, the second candidate set only, or the third candidate set only. The machine learned model 170 outputs information identifying the set of text passages of the target document 110 for highlighting, each text passage corresponding to a passage determined to be relevant. For example, the machine learned model 170 may output character locations or sentence location values for each text passage to highlight. The training and application of the machine learned model 170 is further discussed with respect to FIG. 2.

The database 180 stores information relevant to the highlighting engine 140. The stored data includes, but is not limited to, the training set of information, the training documents 130, the target document 110, candidate sets of text passages within the target document 110 for highlighting, sets of text passages to highlight within the target document 110, document types, matrix representations, text characteristics, user feedback, previously identified sets of text passages, and so on. The highlighting engine 140 can add any such information to the training set of information and can retrain the machine learned model 170 based on this information.

The network 190 transmits data within the document management environment 100. The network 190 may be a local area and/or wide area network using wireless and/or wired communication systems, such as the Internet. In some embodiments, the network 190 transmits data over a single connection (e.g., a data component of a cellular signal, or Wi-Fi, among others), and/or over multiple connections. The network 190 may include encryption capabilities to ensure the security of customer data. For example, encryption technologies may include secure sockets layers (SSL), transport layer security (TLS), virtual private networks (VPNs), and Internet Protocol security (IPsec), among others.

Data Flow of Highlighting Engine

Figure 2:
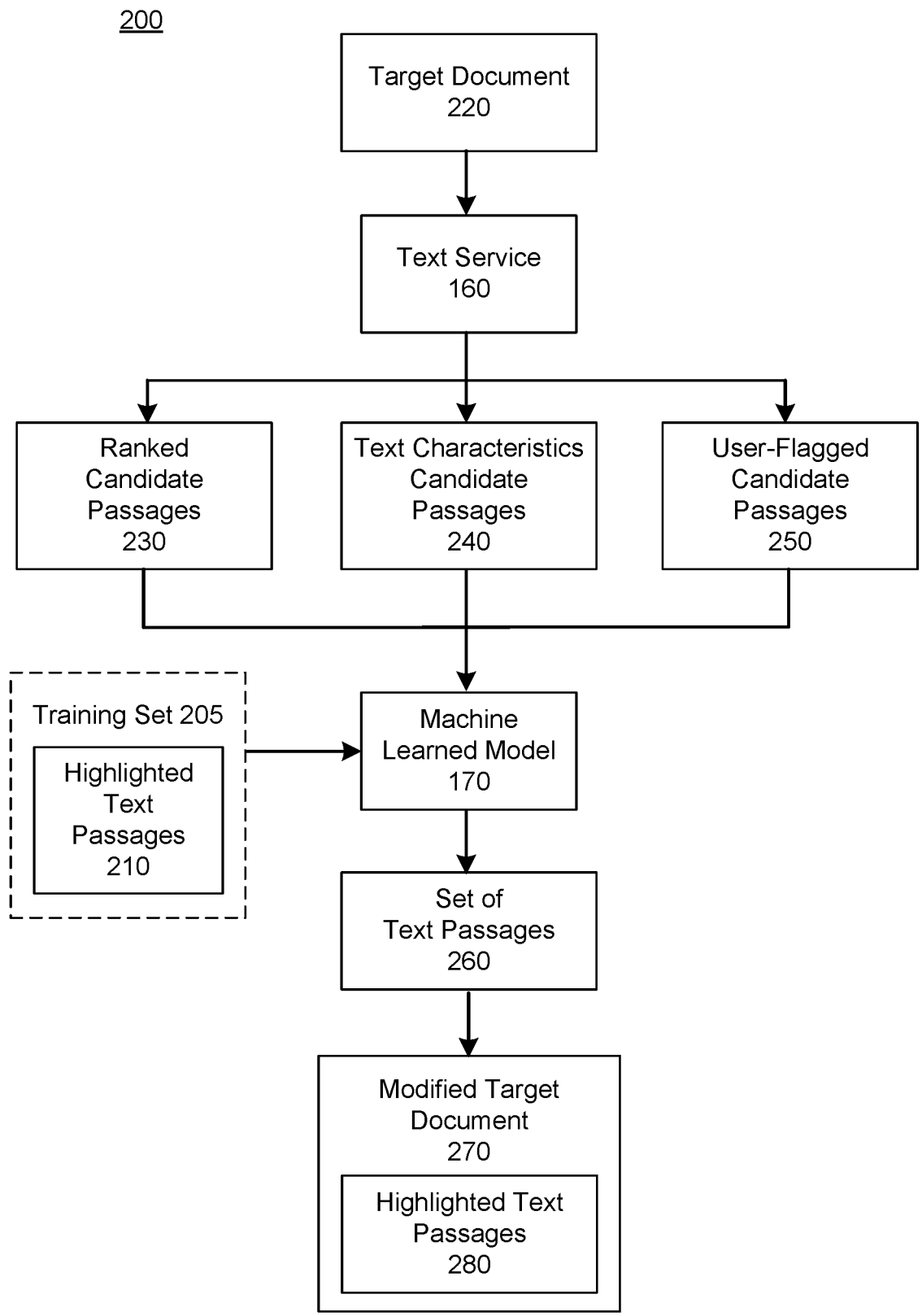
FIG. 2 illustrates data flow within an example highlighting engine, in accordance with one or more embodiments.

FIG. 2 illustrates data flow 200 within an example highlighting engine 140, in accordance with one or more embodiments. The highlighting engine 140 utilizes the candidate passage engine 160 and the machine learned model 170 to modify a target document 220 for highlighting to include at least one highlighted text passage 280 corresponding to a relevant passage of the target document 220. The target document 220 is any document with one or more pages that include various characters (e.g., text, symbols, shapes, images, etc.). Examples of target documents 220 include but are not limited to: a sales contract, a rental and/or lease agreement, a liability waiver, a financial document, an investment term sheet, a purchase order, an employment agreement, a mortgage application, a bank form, and so on. In one embodiment, the highlighting engine 140 accesses the target document 220 for highlighting by receiving the target document 220 from a user of the highlighting engine 140. For example, the user uploads the target document 220 to the highlighting engine 140 or to a document management system associated with the highlighting engine 140. In another embodiment, the user of the highlighting engine 140 generates the target document 220 within the highlighting engine 140 or within the document management system associated with the highlighting engine 140. In some embodiments, the target document 220 is stored within the highlighting engine 140. In other embodiments, the target document 220 is provided to the highlighting engine 140 by a different document system.

The candidate passage engine 160 identifies candidate sets of text passages within the target document 220 for highlighting. The candidate sets of text passages can include ranked candidate passages 230, text characteristics candidate passages 240, and user-flagged candidate passages 250. The candidate sets of text passages are identified by the candidate passage engine 160 more efficiently and accurately than a user may be able to manually identify these text passages. In one embodiment, the candidate passage engine 160 identifies the ranked candidate passages 230 by using object recognition (e.g., optical character recognition (OCR)) to identify characters (i.e., text, shapes, images, patterns, lines, etc.) within a document and a location for each character (e.g., a location coordinate) within the document. The candidate passage engine 160 converts the identified text within the target document 220 into word vectors. The candidate passage engine 160 may use GloVe, Word2vec, or fastText to convert text to word vectors. In one embodiment, the candidate passage engine 160 groups the word vectors for each sentence together and assigns a unique sentence location value for each word vector in the grouping. In some embodiments, the candidate passage engine 160 groups the characters for each sentence together and assigns a unique sentence location value for each character in the grouping.

The candidate passage engine 160 generates a matrix representation of the word vectors with each row corresponding to a text passage (e.g., a sentence) of the target document 220. In one embodiment, the word vectors for each sentence are averaged and the average word vector value is positioned in each row of the matrix representation. The candidate passage engine 160 maps the word vectors onto an undirected weighted graph. For example, the average word vector values may be mapped onto the undirected weighted graph. Each node of the graph corresponds to a text passage and is initialized with a random weight value. Each edge of the graph that connects two nodes has an edge weight that corresponds to a measure of similarity between corresponding text passages. In one example, the edge weight corresponds to a measure of semantic similarity amongst text passages of the target document. The candidate passage engine 160 performs multiple random walk iterations on the undirected weighted graph that update the node weight values and results in a ranking of the text passages by order of relevance. The candidate passage engine 160 identifies a threshold portion of text passages of the target document 220 that are most relevant to the target document 220. The threshold portion of the text passages may include the top 5%, 10%, 15%, 20%, 25%, or any percentage in between of the most relevant passages. The threshold portion of the text passages of the target document 220 are the ranked candidate passages 230.

The candidate passage engine 160 can use object recognition to identify characters (i.e., text) within the document with specific text characteristics. The text passages (e.g., the sentences) that include the identified characters are the text characteristics candidate passages 240. Specific text characteristics may include a font, a size, a position (e.g., a heading, a sub-title, indented text, etc.), or a typographical emphasis (e.g., bold, italicized, underlined, etc.). For example, the candidate passage engine 160 may identify bold text and/or capitalized text within the target document 220. In this example, the sentences containing bold text and/or capitalized text can become the text characteristics candidate passages 240.

The candidate passage engine 160 identifies the user-flagged candidate passages 250 by receiving user input or feedback from a user manually flagged passages considered relevant. In an example implementation, the target document 220 is displayed to the user on a user interface of the client device 120. The user may highlight and/or select candidate text passages (i.e., user-flagged candidate passages 250) for highlighting. It should be noted that although a user may manually highlight a particular passage (or indicate that a particular passage is relevant), the machine learned model 170 may not identify the particular passage as a passage to be highlighted. For instance, a user may highlight a particular payment term within a contract as relevant, but the machine learned model 170 may identify a second passage with the payment term as more relevant and will highlight only the second passage. In such embodiments, the machine learned model 170 considers the passages manually highlighted by a user but does not select all of the manually highlighted passages for highlighting.

In some embodiments, the candidate passage engine 160 compares text of the target document 220 for highlighting to a catalog of previously identified sets of text passages. The previously identified sets of text passages can be stored on the database 180 of the highlighting engine 140. In one embodiment, the previously identified text passages can include text passages identified by the user (e.g., previously user-flagged candidate passages 250). In other embodiments, the previously identified text passages can include text passages within other documents accessible to, created by, or signed by the user. The candidate passage engine 160 can identify an additional candidate set of text passages within the target document 220 based on the comparison. For example, one text passage within the target document 220 matches a previously identified text passage within a different document. The text passage can be included in the additional candidate set of text passages.

In some embodiments, the candidate passage engine 160 determines a document type of the target document 220. The candidate passage engine 160 applies a machine learned model to the target document 220 that identifies the document type based on the content of the target document 220.

For example, the machine learned model can be trained to identify a document type by using a training set (e.g., the training set 205). The training set includes documents, each labeled with a document type. The machine learned model determines a relationship between the document contents and the labeled document type. The candidate passage engine 160 applies the machine learned model to the document contents of the target document 220 to identify a document type of the target document 220. The document type may be a sales contract, an employee agreement, a confidentiality agreement, a rental agreement, a bank form, and so on. For example, the candidate passage engine 160 may determine the target document 220 is a rental agreement based on the machine learned model identifying the words "landlord", "tenant", and "rent" in the target document 220. The identified document type may provide the candidate passage engine 160 with additional information regarding the relevant passages within the target document 220, for instance by mapping certain passage types flagged as relevant within training documents to the document types of the training documents.

The machine learned model 170 takes, as input, the ranked candidate passages 230, the text characteristics candidate passages 240, and the user-flagged candidate passages 250 to identify a set of text passages 260 to be highlighted. In some embodiments, the machine learned model 170 takes, as input, the additional candidate set of text passages identified by the candidate passage engine 160 (e.g., the identified text passages based on the comparison to previously identified text passages). The set of text passages 260 can include one passage, multiple passages, and all or less than all of the collective candidate passages 230, 240, and 250.

As described in FIG. 1, the machine learned model 170 is trained to identify the set of text passages 260 to highlight using a training set of data 205 (e.g., the training set 205"). The training set 205 includes documents, each including a set of highlighted text passages 210. A highlighted text passage 210 is an indication, a classification, or a modification of a document signifying to the user of the highlighting engine 140 that the highlighted text passage is relevant and identifying the location of the text passage within the document. A highlighted text passage 210 can include visual indicators, such as a box surrounding the text passage, a circle surrounding the text passage, a color highlight applied to the text passage, a text box located adjacent to the text passage, a change of font size or color of the text passage, or some combination thereof. In some embodiments, the training set 205 additionally includes information about the document, such as a document type.

The highlighting engine 140 uses supervised or semi-supervised machine learning to generate the training dataset 205 necessary to train the machine learned model 170. Different machine learning techniques may be used in various embodiments, such as linear support vector machines (linear SVM), boosting for other algorithms (e.g., AdaBoost), neural networks, reinforcement learning, logistic regression, naïve Bayes classifiers, memory based learning, random forests, bagged trees, decision trees, boosted trees, or boosted stumps.

Training of the machine learned model 170 helps the model 170 identify a set of text passages 260 of the target document 220 to highlight. In other words, training the machine learned model 170 enables the machine learned model 170 to identify the relationships between documents within the document management environment 100 and relevant text passages within the documents in order to identify a set of text passages 260 to highlight within subsequently received target documents 220 for highlighting. The machine learned model 170 automatically identifies a set of text passages 260 more accurately and efficiently than the conventional methods described above.

The trained machine learned model 170, when applied to the identified candidate sets of text passages (i.e., when applied to the ranked candidate passages 230, the text characteristics candidate passages 240, and the user-flagged candidate passages 250) within the target document 220 for highlighting, determines a set of text passages to highlight 260. In some embodiments, the trained machine learned model 170 is applied to the additional candidate set of text passages, e.g., the identified text passages based on the comparison to previously identified text passages, in addition to the ranked candidate passages 230, the text characteristics candidate passages 240, and the user-flagged candidate passages 250. The trained machine learned model 170, in some embodiments, extracts information from the ranked candidate passages 230, the text characteristics candidate passages 240, and the user-flagged candidate passages 250, and based on the extracted information, identifies words corresponding to one or more of a name, an organization, and a date. In these embodiments, the set of text passages 260 are identified based at least in part on the identified words.

The machine learned model 170 outputs information identifying the set of text passages 260 of the target document 220 for highlighting. For example, the machine learned model 170 may output character locations and/or sentence location values for each text passage within the set of text passages 260 to highlight.

The modified target document 270 is displayed to the user via the client device 120. The modified target document 270 includes at least one highlighted text passage 280. The highlighted text passage 280 may include visual indicators identifying the location of the highlighted text passage 280, such as a box, a circle, a highlight, change of font color, etc.

In some embodiments, the user may participate in the automated document highlighting process. For example, the user provides feedback regarding the modified target document 270. For example, the user may provide approval of the modified target document 270. The approval may signify to the highlighting engine 140 that the modified target document 270 is ready to be sent to a receiving party in the document management environment. In another example, the user may delete one or more of the highlighted text passages 280 (for instance, in embodiments where the automatic highlight is incorrect, or in embodiments where the user does not want the highlight to be present), may add one or more highlighted text passages, and/or may update one or more of the highlighted text passages 280 (for instance, in embodiments where the user wants to move a location of the highlight). The highlighting engine 140 can subsequently re-train the machine learned model 170 based on the user feedback.

Figure 3A:
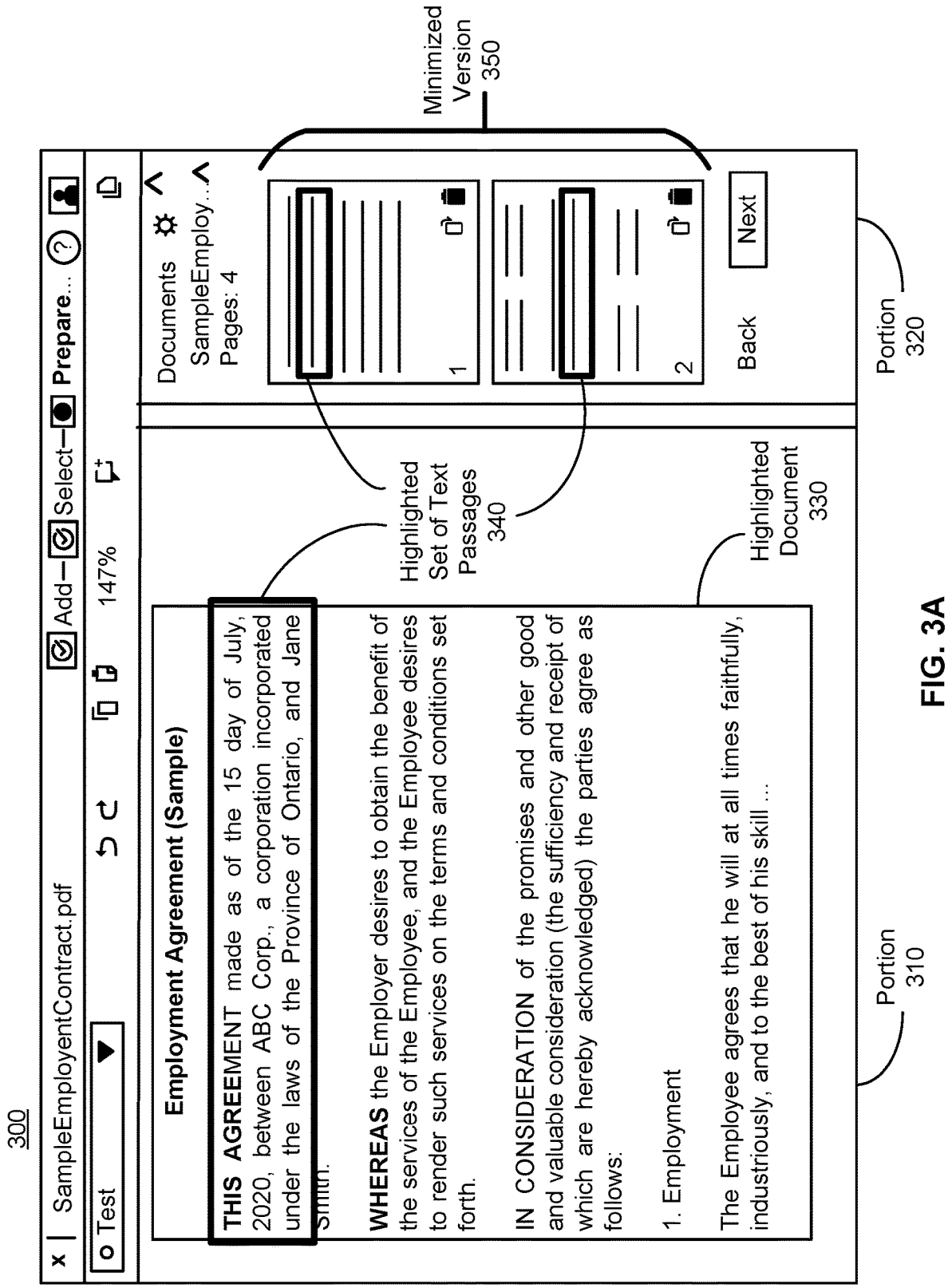
FIG. 3A illustrates an example interface in which an automatically highlighted document may be presented to a user, in accordance with one or more embodiments.

Example Presentations of Highlighted Document within Document Management Environment FIG. 3A illustrates an example interface 300 in which an automatically highlighted document 330 may be presented to a user, in accordance with one or more embodiments. After identifying a set of text passages within the target document 110 for highlighting, the document highlighting engine 140 modifies the target document 110 by highlighting the identified set of text passages and presents the modified target document (i.e., a highlighted document 330) to the user of the client device 120.

In an interface portion 310 of the interface 300, the highlighted document 330 is displayed to the user. The highlighted document 330 includes various highlighted text passages 340. In this example implementation, the highlight is illustrated as boxes around the text passages (i.e., boxes encompassing text passages of the document that correspond to relevant passages).

An example of a highlighted text passage within the highlighted set of text passages 340 within the embodiment of FIG. 3A includes a passage providing information about the effective date of the agreement (i.e., Jul. 15, 2020) and the parties executing the agreement (i.e., ABC Corp. and Jane Smith).

In an interface portion 320 of the interface 300, the highlighted document 330 is displayed in a minimized version 350 to the user. As can be seen in FIG. 3A, the minimized version 350 includes the highlighted set of text passages 340 that correspond to the highlighted text passages 340 of the highlighted document 330. In some embodiments, in response to a selection of a highlighted portion within a minimized version 350 of the highlighted document 330, the interface portion 310 can be updated to include the selected highlighted portion (and other content within the page that includes the selected highlighted portion).

In some embodiments, the interface 300 of the client device 120 enables the user to provide feedback on the automatically highlighted text passages 340 of the document 330. A user may edit, add, and/or delete any of all of the individual highlighted text passages of the set of highlighted text passages 340. The interface 300 may enable the user to send the highlighted document 330 to a receiving party for signature.

Figure 3B:
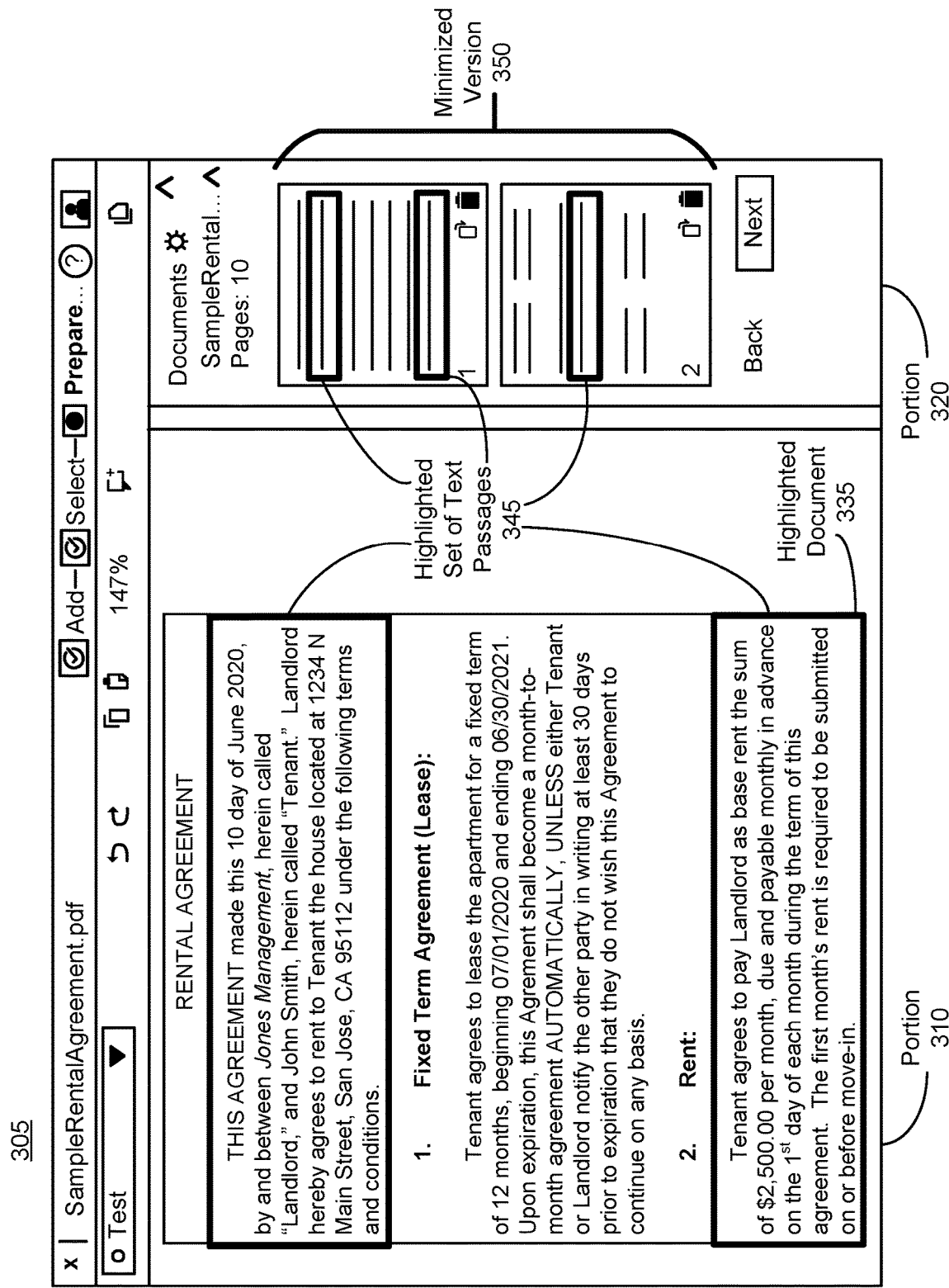
FIG. 3B illustrates another example interface in which a different automatically highlighted document may be presented to a user, in accordance with one or more embodiments.

FIG. 3B illustrates another example interface 305 in which a different automatically highlighted document 335 may be presented to a user, in accordance with one or more embodiments. FIG. 3B is substantially similar to FIG. 3A, except the highlighted set of text passages 345 in the highlight document 335 are different. For example, one of the highlighted text passages of the highlighted set of text passages 345 is a text passage that discusses how much rent (i.e., $2,500.00) a tenant is to pay the landlord and when the rent is due (i.e., the $1^{st}$ day of each month). The minimized version 350 of the highlighted document 335 illustrates the highlighted set of text passages 345 that correspond with the highlighted set of text passages 345 found in the highlighted document 335 in the interface portion 310.

Process for Highlighting Passages in a Document

Figure 4:
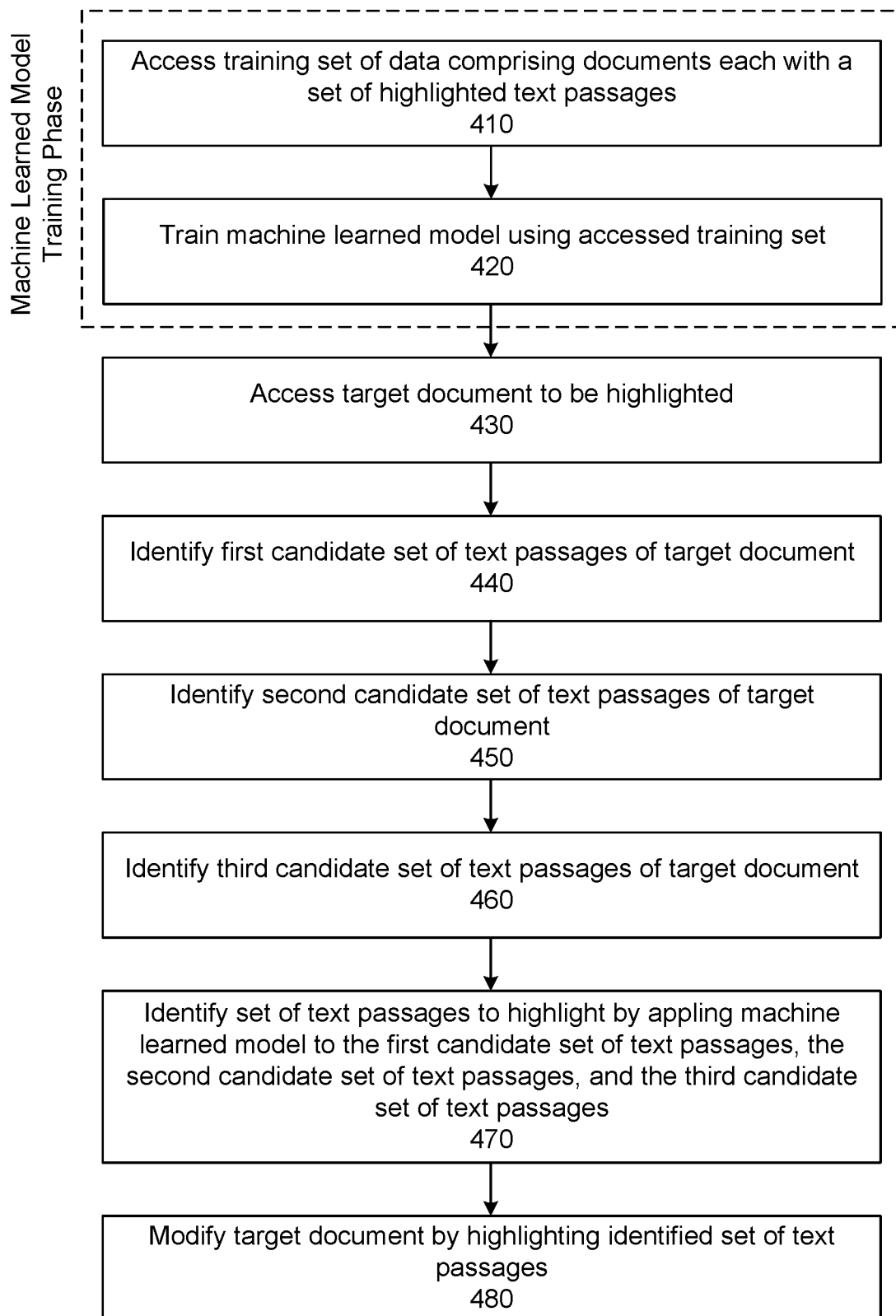
FIG. 4 illustrates an example process for automatically highlighting a document, in accordance with one or more embodiments.

FIG. 4 illustrates an example process for automatically highlighting a set of text passages in a document within a document management environment, in accordance with one or more embodiments. This example process is more accurate and more efficient than manual document highlighting processes as described above.

A highlighting engine of the document management environment accesses 410 a training set of data including (for example) training documents each with a set of highlighted text passages. The highlighted text passages for a document are passages considered or determined to be relevant for that document. As noted above, a relevant passage is a text passage of a document that provides certain contextual information about the document (e.g., the names of the parties to the agreement, financial terms, etc.). A text passage is a portion of the document, such as a clause or a sentence. The highlighted text passage may be designated by a visual indicator, such as a box, a circle, a highlight, change of font color, and so on. In one embodiment, the training set of information is previously highlighted documents accessible to and/or manually created by a user. In some embodiments, the training set of information may also include information about a document type for each document in the training set. The document type is a category of document, such as a sales contract, employee agreement, confidentiality agreement, rental agreement, and so on.

The highlight engine trains 420 a machine learned model using the accessed training set of data. The machine learned model is configured to identify a set of text passages of a target document to highlight, for instance based on correlations between content of training documents and the highlighted text passages within the training documents. In one example, the machine learned model may be a convolutional neural network. In some embodiments, the machine learned model determines relationships between content of documents, the highlighted text passages within the documents, and the document types. The machine learned model, when applied to subsequent documents in the document management environment, can output an identified set of text passages for highlighting for each document. In one example implementation, the machine learned model outputs location coordinates for each identified text passage in the set.

The highlighting engine accesses 430 a target document for highlighting within the document management environment. For instance, the target document can be a contract or an employment agreement uploaded to the document management environment by a client device. Likewise, the target document may be created and collaboratively modified within the document management environment by a number of entities. The target documents for highlighting may be associated with an organization and/or a customer account within the document management environment. The highlighting engine accesses the target document for highlighting by receiving, generating, and/or accessing a stored target document for highlighting within the document management environment. In some embodiments, the document highlighting engine accesses the target document to be highlighted by accessing a stored target document within a document system separate from the highlighting engine.

The highlighting engine identifies 440 a first candidate set of text passages of the target document. As noted above, the first candidate set of text passages are ranked candidate passages. In one embodiment, the highlight engine utilizes object recognition processes to identify the characters (e.g., text) of the target document. The highlighting engine converts text of the target document into word vectors using, e.g., GloVe, Word2vec, or fastText. In some embodiments, the word vectors in each sentence and/or the characters in each sentence are grouped together and assigned a unique sentence location value. The word vectors are placed in a matrix representation of the target document by the highlighting engine. Each row of the matrix representation may correspond to a text passage (i.e., to a sentence) of the target document. In one example implementation, an average word vector value is determined for each text passage (i.e., for each row of the matrix representation) and positioned in each row. The highlighting engine constructs an undirected weighted graph from the matrix representation with each node corresponding to a text passage and having a random initial weight. Each edge of the undirected weighted graph connects two nodes and has an initial weight that corresponds to a measure of similarity between corresponding text passages. In one example, the initial edge weight may correspond to a measure of semantic similarity between text passages. The highlighting engine performs multiple random walk iterations that update the weight values of the nodes resulting in a ranking of text passages by order of relevance. In one example implementation, the highlighting engine determines that a threshold portion of text passages that are most relevant may include the top 10% of most relevant sentences or include all text passages above a relevance threshold. In the embodiment of FIG. 4, the threshold portion of text passages of the target document are the first candidate set of text passages.

The highlighting engine identifies 450 a second candidate set of text passages within the target document. As noted above, the second candidate set of text passages are the text characteristics candidate passages. The second candidate set of text passages are determined based on characteristics of text found in the text passage. For example, the highlighting engine can utilize object recognition processes to identify specific characteristics of text of the target document. Characteristics of text may include one or more of: a font, a size, a position, or a typographical emphasis. For example, a text passage within the target document that includes bolded text (i.e., a typographical emphasis) may be included in the second candidate set of text passages.

The highlighting engine identifies 460 a third candidate set of text passages within the target document. In the embodiment of FIG. 4, the third candidate set of text passages are user-flagged candidate passages. For example, the highlighting engine receives user feedback which includes a selection of one or more text passages to be highlighted. The selected text passages are the third candidate set of text passages.

In one embodiment, the highlighting engine determines a document type of the target document. The highlighting engine may apply a second machine learned model to the target document to identify the document type of the target document based on content of the target document. The document type can inform the highlighting engine of potentially relevant passages to be identified.

The highlighting engine identifies 470 the set of text passages to highlight by applying the machine learned model to the first candidate set of text passages, the second candidate set of text passages, and the third candidate set of text passages. In one embodiment, the machine learned model extracts information from the first candidate set of text passages, the second candidate set of text passages, and the third candidate set of text passages to identify words corresponding to one or more of: a name, an organization, and a date. The set of text passages may be identified based in part on the identified words. In some embodiments, the machine learned model is applied to a fourth candidate set of text passages identified by the highlighting engine based on a comparison of the text of the target document to a catalog of previously identified sets of text passages. In one example, the previously identified sets of text passages may include text passages identified by the user. In another example, the previously identified sets of text passages may include text passages within other documents accessible to, created by, or signed by the user. The machine learned model can output location coordinates for the characters (i.e., text) to be highlighted. In another example, the machine learned model can output one or more sentence location values that are unique to all characters within a particular sentence.

The highlighting engine modifies 480 the target document by highlighting the identified set of text passages. In one embodiment, the highlighting engine highlights the identified set of text passages by highlighting characters of the identified set of text passage at the character locations corresponding to the characters. In some embodiments, the highlighting engine highlights the identified set of text passages by highlighting the corresponding sentence location values. The highlighted text passages include the relevant passages of the target document.

It should be noted that although the example of FIG. 4 is described in the context of a target document, in practice, the process of FIG. 4 can be applied to a plurality of target documents associated with one or more user accounts and/or one or more organizations or entities.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method of automatically highlighting text passages within a target document comprising:
   identifying a first candidate set of text passages of the target document based on a matrix representation of the target document;
   identifying a second candidate set of text passages within the target document based on characteristics of text of the second candidate set of text passages;
   identifying a third candidate set of text passages within the target document based on feedback from the user;
   identifying a target set of text passages to highlight by applying a supervised machine learned model to the first candidate set of text passages, the second candidate set of text passages, and the third candidate set of text passages, the supervised machine learning model trained using a training set of data comprising documents each with a set of highlighted text passages, at least a portion of the set of the highlighted text passages at least partially highlighted by a user; and
   modifying the target document by highlighting the target set of text passages.

2. The method of claim 1, further comprising identifying characters within the target document and a character location for each identified character in the target document, wherein modifying the target document by highlighting the target set of text passages comprises highlighting the characters of the target set of text passages at the character locations corresponding to the characters.

3. The method of claim 2, wherein identifying characters of the target document and the character location for each identified character comprises assigning a sentence location value for every character in a sentence, wherein the sentence location value is unique for each sentence, and wherein highlighting the target set of text passages is based on the corresponding sentence location values.

4. The method of claim 1, further comprising determining a document type of the target document by applying a second machine learned model to the target document, the second machine learned model configured to identify the document type of the target document based on content of the target document, wherein one or more of the first candidate set of text passages, the second candidate set of text passages, and the third candidate set of text passages are identified based additionally on the determined document type of the target document.

5. The method of claim 1, wherein the values of each row corresponding to word vectors of the matrix representation include an average word vector value of the word vectors in each text passage of the target document.

6. The method of claim 1, wherein applying the supervised machine learned model to the first candidate set of text passages, the second candidate set of text passages, and the third candidate set of text passages comprises performing an information extraction operation on the first candidate set of text passages, the second candidate set of text passages, and the third candidate set of text passage to identify words corresponding to one or more of a name, an organization, and a date, and wherein the target set of text passages are identified based at least in part on the identified words.

7. The method of claim 1, further comprising:
   comparing the text of the target document to a catalog of previously identified sets of text passages;
   identifying a fourth candidate set of text passages within the target document based on the comparison; and
   identifying the target set of text passages to highlight by additionally applying the supervised machine learned model to the fourth candidate set of text passages.

8. The method of claim 7, wherein the previously identified sets of text passages include text passages identified by the user.

9. The method of claim 7, wherein the previously identified sets of text passages include text passages within other documents accessible to, created by, or signed by the user.

10. The method of claim 1, wherein the characteristics of text of the second candidate set of text passages include one of: a font, a size, a position, or a typographical emphasis.

11. The method of claim 1, wherein the target document is accessed by:
    receiving the target document to be highlighted from a user of a document management system;
    generating the target document to be highlighted within the document management system;
    accessing the target document to be highlighted from storage of the document management system; or
    accessing the target document to be highlighted from a document system different than the document management system.

12. A non-transitory computer readable storage medium comprising computer executable instructions for automatically highlighting text passages within a target document that when executed by one or more processors causes the one or more processors to perform operations comprising:
    identifying a first candidate set of text passages of the target document based on a matrix representation of the target document;
    identifying a second candidate set of text passages within the target document based on characteristics of text of the second candidate set of text passages;
    identifying a third candidate set of text passages within the target document based on feedback from the user;
    identifying a target set of text passages to highlight by applying a supervised machine learned model to the first candidate set of text passages, the second candidate set of text passages, and the third candidate set of text passages, the supervised machine learning model trained using a training set of data comprising documents each with a set of highlighted text passages, at least a portion of the set of the highlighted text passages at least partially highlighted by a user; and
    modifying the target document by highlighting the target set of text passages.

13. The non-transitory computer-readable medium of claim 12, the operations further comprising identifying characters within the target document and a character location for each identified character in the target document, wherein modifying the target document by highlighting the target set of text passages comprises highlighting the characters of the target set of text passages at the character locations corresponding to the characters.

14. The non-transitory computer-readable medium of claim 13, wherein identifying characters of the target document and the character location for each identified character comprises assigning a sentence location value for every character in a sentence, wherein the sentence location value is unique for each sentence, and wherein highlighting the target set of text passages is based on the corresponding sentence location values.

15. The non-transitory computer-readable medium of claim 12, the operations further comprising determining a document type of the target document by applying a second machine learned model to the target document, the second machine learned model configured to identify the document type of the target document based on content of the target document, wherein one or more of the first candidate set of text passages, the second candidate set of text passages, and the third candidate set of text passages are identified based additionally on the determined document type of the target document.

16. The non-transitory computer-readable medium of claim 12, wherein the values of each row corresponding to word vectors of the matrix representation include an average word vector value of the word vectors in each text passage of the target document.

17. The non-transitory computer-readable medium of claim 12, wherein applying the supervised machine learned model to the first candidate set of text passages, the second candidate set of text passages, and the third candidate set of text passages comprises performing an information extraction operation on the first candidate set of text passages, the second candidate set of text passages, and the third candidate set of text passage to identify words corresponding to one or more of a name, an organization, and a date, and wherein the target set of text passages are identified based at least in part on the identified words.

18. A system comprising:
memory with instructions encoded thereon; and
one or more processors that, when executing the instructions, are caused to perform operations comprising:
identifying a first candidate set of text passages of the target document based on a matrix representation of the target document;
identifying a second candidate set of text passages within the target document based on characteristics of text of the second candidate set of text passages;
identifying a third candidate set of text passages within the target document based on feedback from the user;
identifying a target set of text passages to highlight by applying a supervised machine learned model to the first candidate set of text passages, the second candidate set of text passages, and the third candidate set of text passages, the supervised machine learning model trained using a training set of data comprising documents each with a set of highlighted text passages, at least a portion of the set of the highlighted text passages at least partially highlighted by a user; and
modifying the target document by highlighting the target set of text passages.

19. The system of claim 18, the operations further comprising identifying characters within the target document and a character location for each identified character in the target document, wherein modifying the target document by highlighting the target set of text passages comprises highlighting the characters of the target set of text passages at the character locations corresponding to the characters.

20. The system of claim 19, wherein identifying characters of the target document and the character location for each identified character comprises assigning a sentence location value for every character in a sentence, wherein the sentence location value is unique for each sentence, and wherein highlighting the target set of text passages is based on the corresponding sentence location values.

* * * * *